United States Patent [19]
Wiser et al.

[11] Patent Number: 4,771,377
[45] Date of Patent: Sep. 13, 1988

[54] MICROCODE CONTROL APPARATUS

[75] Inventors: Donald C. Wiser, Sutton; David I. Epstein, Framingham; Mark D. Hummel, Bellingham; Patrick J. Weiler, Watertown; Thomas J. Myer, Grafton, all of Mass.

[73] Assignee: Data General Corporation, Westboro, Mass.

[21] Appl. No.: 798,522

[22] Filed: Nov. 15, 1985

[51] Int. Cl.⁴ .............................................. G06F 9/30
[52] U.S. Cl. ................................................... 364/200
[58] Field of Search ... 364/200 MS File, 900 MS File

[56] References Cited

U.S. PATENT DOCUMENTS 4,050,096  9/1977  Bennett et al. ...................... 364/200
4,366,540 12/1982  Berglund et al. .................... 364/200
4,430,706  2/1984  Sand ................................... 364/200

Primary Examiner—Eddie P. Chan
Attorney, Agent, or Firm—Robert L. Dulaney

[57] ABSTRACT

Apparatus and method is disclosed for controlling the timing of the addressing, fetching and executing of microinstructions in a data processing system such that delayed sequencing microinstructions, stretched delayed sequencing microinstructions and immediate sequencing microinstructions may be intermixed in the microinstruction stream. Circuitry is provided to determine the type of sequencing specified for each microinstruction and control the generation of the execution cycle signal and the microinstruction address clocking signal such that these signals occur in the appropriate time sequence to accomplish the specified sequencing.

9 Claims, 4 Drawing Sheets

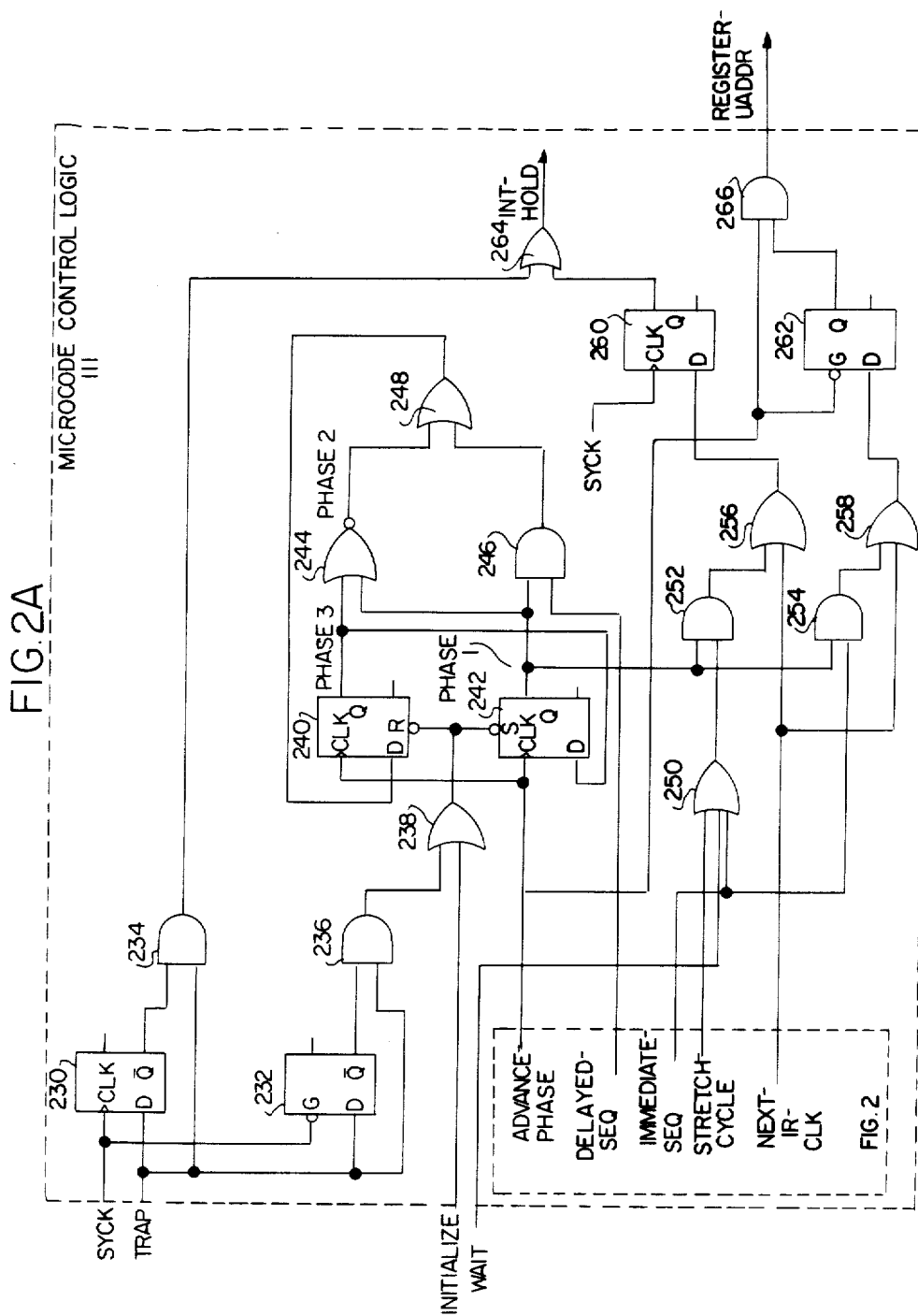

MICROCODE CONTROL APPARATUS

BACKGROUND OF THE INVENTION

1. Field of the Invention The present application relates generally to central processing units and more particularly to apparatus for controlling the addressing, fetching and executing of microinstructions.

2. Description of the Prior Art

In many known computer systems, microinstructions for controlling the operation of the central processing unit are stored in the form of microcoded microinstructions in a "control store" device, such as a PROM. During operation of the computer system, these microinstructions are individually fetched from the control store and executed. Prior art computer systems typically use one of two techniques for addressing, fetching and executing microinstructions: delayed sequencing or immediate sequencing.

In delayed sequencing, the address from which a microinstruction will be fetched is determined during a first microinstruction execution cycle or "microcycle". The microinstruction is fetched from the specified address in the following microcycle and executed in the microcycle following that. A total of three execution cycles are, therefore, involved in the addressing, fetching and executing process.

In immediate sequencing, the specification of the microinstruction address and the fetching of the microinstruction are both accomplished in one execution cycle. The fetched microinstruction is executed in the following microcycle. This technique uses two execution cycles to complete the addressing, fetching and execution of a microinstruction.

The use of either of these approaches has certain drawbacks. By the nature of delayed sequencing, it takes two microcycles from the time a test is performed until microinstruction sequencing can be affected. Delayed sequencing is often wasteful of processor time since it is not always possible to perform useful actions while the system is waiting until the second microcycle to perform the branch operation. An immediate sequencing system avoids the wasted microcycle, but, to allow for the completion of addressing and fetching in one cycle, the execution cycle is normally of longer duration than a delayed sequencing execution cycle. This longer cycle length is similarly wasteful of processor time since many microinstructions have completed execution well prior to the end of the cycle.

The present invention relates to a novel circuit for resolving the above and other prior art problems.

SUMMARY OF THE INVENTION

The present invention relates to apparatus for controlling the addressing, fetching and executing of microinstructions in a manner that allows intermixing of, and transitioning between, delayed sequencing microinstructions and immediate sequencing microinstructions. Apparatus for implementing the present invention includes apparatus for generating an execution cycle signal, apparatus for generating a microinstruction address clocking signal, apparatus for detecting the sequencing type specified in the current microinstruction and apparatus for controlling the timing of the generation of the execution cycle and address clocking signals as required by the specified sequencing type.

It is a feature of the invention that the execution cycle can be lengthened to allow extra execution time for certain microinstructions which cannot complete execution in the standard execution cycle.

It is an additional feature of the invention that a microinstruction may specify that the type of sequencing to be used will be based on the results of a test performed by another system element.

It is a further feature of the invention that generation of the execution cycle and address clocking signals may be delayed in response to various system conditions.

Other features and advantages of the present invention will be understood by those of ordinary skill in the art after referring to the detailed description of the preferred embodiment and drawings herein.

BRIEF DESCRIPTION OF THE DRAWINGS

FIG. 2 and 2A show schematic diagrams which comprise microcode control logic 111.

DESCRIPTION OF THE PREFERRED EMBODIMENT

Figure 1:
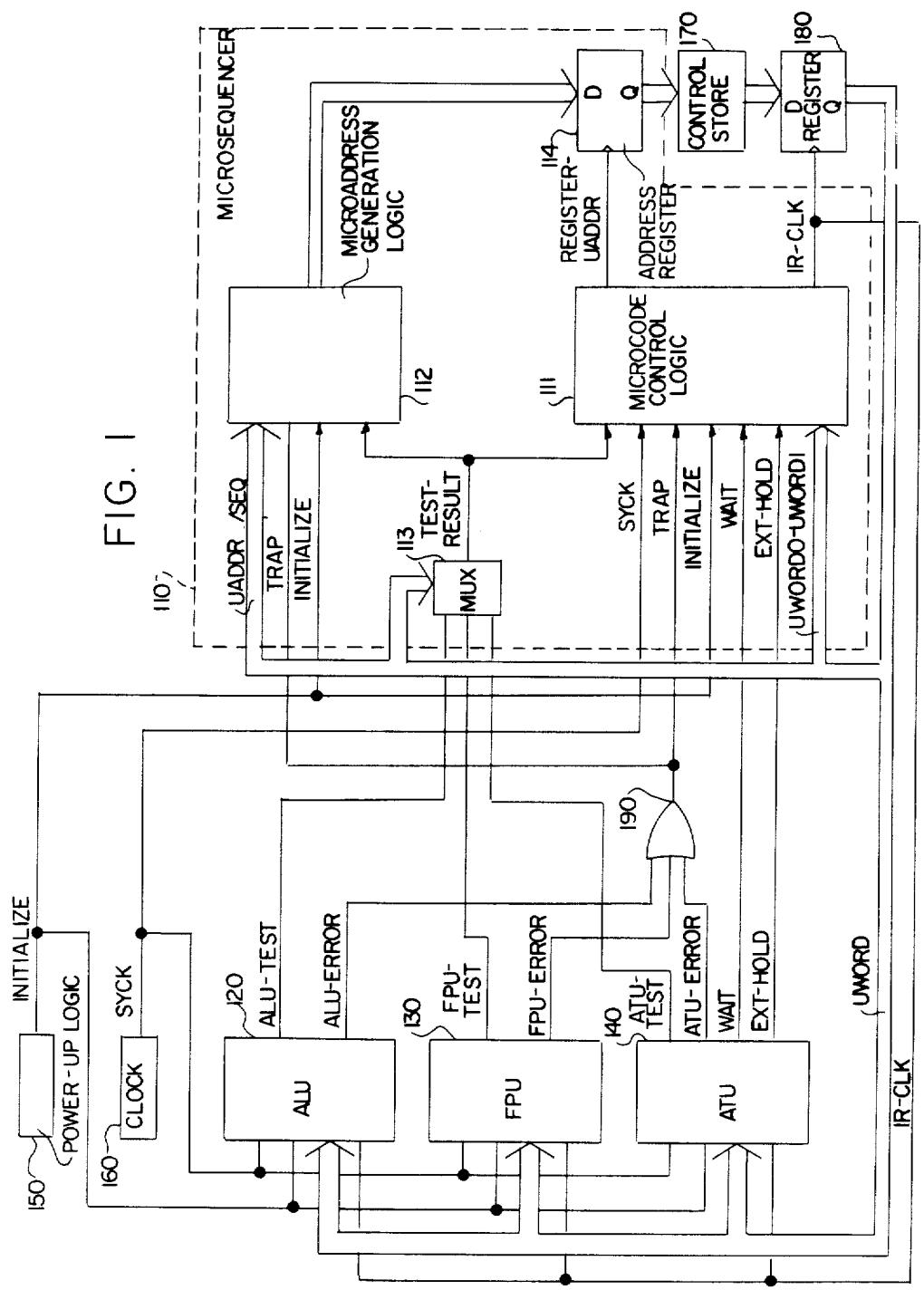
FIG. 1 is a block diagram of a central processing unit embodying the present invention.

Looking first at FIG. 1, a simplified block diagram of a central processing unit (CPU) is shown. As will be well understood by those skilled in the art, the disclosed CPU is but one example of a system with which the subject invention may be employed. The various signals commonly interchanged among the known CPU elements in prior art computer systems are well understood by those of ordinary skill in the art, and, for clarity of presentation, signals not relevant to the description and understanding of the invention have not been shown.

FIG. 1 discloses a CPU having microsequencer 110, arithmetic and logic unit (ALU) 120, floating-point unit (FPU) 130, address translation unit (ATU) 140, power-up logic 150, clock 160, control store 170, and register 180. Microsequencer 110, ALU 120, FPU 130 and ATU 140 receive a system initialization signal (Initialize) from power-up logic 150 and a master system clock signal (SYCK) from clock 160. ALU 120, FPU 130 and ATU 140 also receive the execution cycle signal (IR_CLK) from microcode control logic 111 and selected portions of the present microinstruction (UWORD) from register 180. ALU 120, FPU 130 and ATU 140 each performs various internal operations based on the present microinstruction or other operational conditions to determine the appropriate sequencing for subsequent microinstructions. ALU 120, FPU 130 and ATU 140 control this future sequencing by each providing a "test" output (ALU_TEST, FPU_TEST and ATU_TEST respectively) to multiplexer (MUX) 113, where the selection of the test signal to be passed on to microaddress generation logic 112 and microcode control logic 111 is controlled by a portion of the present microinstruction.

ALU 120, FPU 130 and ATU 140 also provide "error" signals (ALU_ERROR, FPU_ERROR and ATU_ERROR respectively) to OR gate 190. The output of gate 190 is provided to microcode control logic 111 as TRAP, indicating that execution of the current microinstruction must be terminated and a new microinstruction be fetched from control store 170. In addition, ATU 140 provides WAIT, indicating that all conditions have not been met for the starting of the current microinstruction execution cycle, and EXT_HOLD, indicating that ATU 140 is not ready for the present execution cycle to terminate, to microcode control logic 111.

Microsequencer 110 is shown in FIG. 1 to contain microcode control logic 111, microaddress generation logic 112, mux 113 and address register 114. Microsequencer 110 is responsible for generating the address in control store 170 from which the next microinstruction will be fetched, for providing the address to control store 170 to allow fetching of the next microinstruction, and for clocking the new microinstruction from control store 170 into register 180 to start the next execution cycle. In addition to INITIALIZE from power-up logic 150, TRAP from gate 190 and TEST_RESULT from mux 113, microcode control logic 111 and microaddress generation logic 112 each receive selected portions of the current microinstruction stored in register 180. Microaddress generation logic 112 receives an address field (UADDR) to be used to determine the address of the next microinstruction to be fetched and a sequencing field (SEQ) indicating the appropriate operation related to the address (e.g. JUMP, CALL or RETURN). Microcode control logic receives a 2-bit field, UWORD0 and UWORD1, used to control the sequencing of the current microinstruction.

Microaddress generation logic 112 determines the address for the next microinstruction and provides it to the D inputs of address register 114. The design and operation of addressing logic, such as microaddress generation logic 112, is well known to those of ordinary skill in the art and is not discussed in detail herein. Microcode control logic 111, discussed in detail below, generates REGISTER_UADDR, to clock the address from microaddress generation logic 112 into address register 114, and IR_CLK, to clock the next microinstruction into register 180 and start the next microinstruction execution cycle.

In this illustrative embodiment of the invention, there are three possible combinations of timing and execution: (1) a "normal" microcycle (2 SYCK cycles) with delayed sequencing, (2) a "stretched" microcycle (3 SYCK cycles) with immediate sequencing, and (3) a stretched microcycle with delayed sequencing (also 3 SYCK cycles). As discussed in more detail below, any microcycle, regardless of sequencing type, may be extended under certain conditions to last more than its nominal 2 or 3 SYCK cycles.

The selection of the type of sequencing to be used for each microinstruction is controlled by the UWORD0 and UWORD1 bits of that microinstruction. As stated above, if the current microinstruction specifies delayed sequencing, the microinstruction address is determined during the first microcycle, the microinstruction is fetched during the second microcycle and executed during the third microcycle. If the current microinstruction specifies immediate sequencing, the microinstruction address is determined and the microinstruction is fetched in one microcycle and the microinstruction is executed in the following microcycle.

Table 1 illustrates the sequencing for a series of delayed sequencing instructions. In the table, individual microinstructions are specified by capital letters.

TABLE 1

|  | Execution Cycle | | | | | | |
|---|---|---|---|---|---|---|---|
|  | 1 | 2 | 3 | 4 | 5 | 6 | 7 |
| Address Specified | A | B | C | D | E | F | G |

TABLE 1-continued

|  | Execution Cycle | | | | | | |
|---|---|---|---|---|---|---|---|
|  | 1 | 2 | 3 | 4 | 5 | 6 | 7 |
| Microinstruction Fetched | Z | A | B | C | D | E | F |
| Microinstruction Executed | Y | Z | A | B | C | D | E |

It can be seen from Table 1 that microinstruction A, for example, is addressed in cycle 1, fetched in cycle 2 and executed in cycle 3. Therefore, three operations are occurring simultaneously during each execution cycle. Looking, for example, at execution cycle 1, (a) microinstruction Y, latched in register 180, is being executed by the system, (b) the address to be used to fetch microinstruction A is being determined in microaddress generation logic 112 and (c) microinstruction Z is being fetched from control store 170.

Table 2 illustrates the sequencing for a series of immediate execution microinstructions:

TABLE 2

|  | Execution Cycles | | | | | | |
|---|---|---|---|---|---|---|---|
|  | 1 | 2 | 3 | 4 | 5 | 6 | 7 |
| Address Specified | A | B | C | D | E | F | G |
| Microinstruction Fetched | A | B | C | D | E | F | G |
| Microinstruction Executed | Z | A | B | C | D | E | F |

Looking at execution cycle 1 in Table 2, for example, it can be seen that the addressing and fetching of microinstruction A are both occurring during the microcycle while microinstruction Z is being executed.

Table 3 illustrates an example of the sequencing for mixed operation having both delayed and immediate sequencing microinstructions. In the example shown in Table 3, the UWORD0 and UWORD1 bits specify delayed sequencing (indicated by a lower case "d" in the table) for microinstructions Y, Z, D, D+1 and E and specify immediate sequencing (indicated by a lower case "i") for microinstructions A and C.

TABLE 3

|  | Execution Cycles | | | | | | |
|---|---|---|---|---|---|---|---|
|  | 1 | 2 | 3 | 4 | 5 | 6 | 7 |
| Address Specified | A | B | C | D | E | F | G |
| microinstruction Fetched | Z | A | C | D | D+1 | E | F |
| microinstruction Executed | Y | Z | A | C | D | D+1 | E |
| Sequencing Specified | d | d | i | i | d | d | d |

Looking at Table 3, it can be seen that the transition from delayed sequencing in execution cycle 2 to immediate sequencing in execution cycle 3 causes a transition in microinstruction flow. Since microinstruction A specifies immediate sequencing, microinstruction C is both addressed and fetched during cycle 3. Microinstruction B, which was addressed by microinstruction Z in microcycle 2, is not fetched or executed. However, as will be appreciated by those skilled in the art, if microinstruction A is a "continue" microinstruction or if the microinstruction flow is dependent on a conditional operation which returns a "false" status, then microinstruction B will be fetched and executed, as would have occurred in the delayed sequencing case.

Looking at execution cycles 4 and 5 of Table 3, the situation of transitioning from immediate sequencing to delayed sequencing is illustrated. Microinstruction C specifies immediate sequencing, causing microinstruction D to be both addressed and fetched in microcycle 4. Microinstruction D, however, specifies delayed sequencing, meaning that microinstruction E, which is addressed by microinstruction D in microcycle 5, will not be fetched until microcycle 6. Therefore, the address of the microinstruction to be fetched in microcycle 5 is not expressly specified by a microinstruction. This situation is readily handled by assuming that all immediate microinstructions in effect specify two addresses: the express address, specified in the UADDR field of C, of microinstruction D to be fetched in execution cycle 4 if D specifies immediate sequencing and an implicit address, in this embodiment the address of the microinstruction following D (identified as D+1), to be fetched in microcycle 5 if microinstruction D specifies delayed sequencing.

Figure 2:
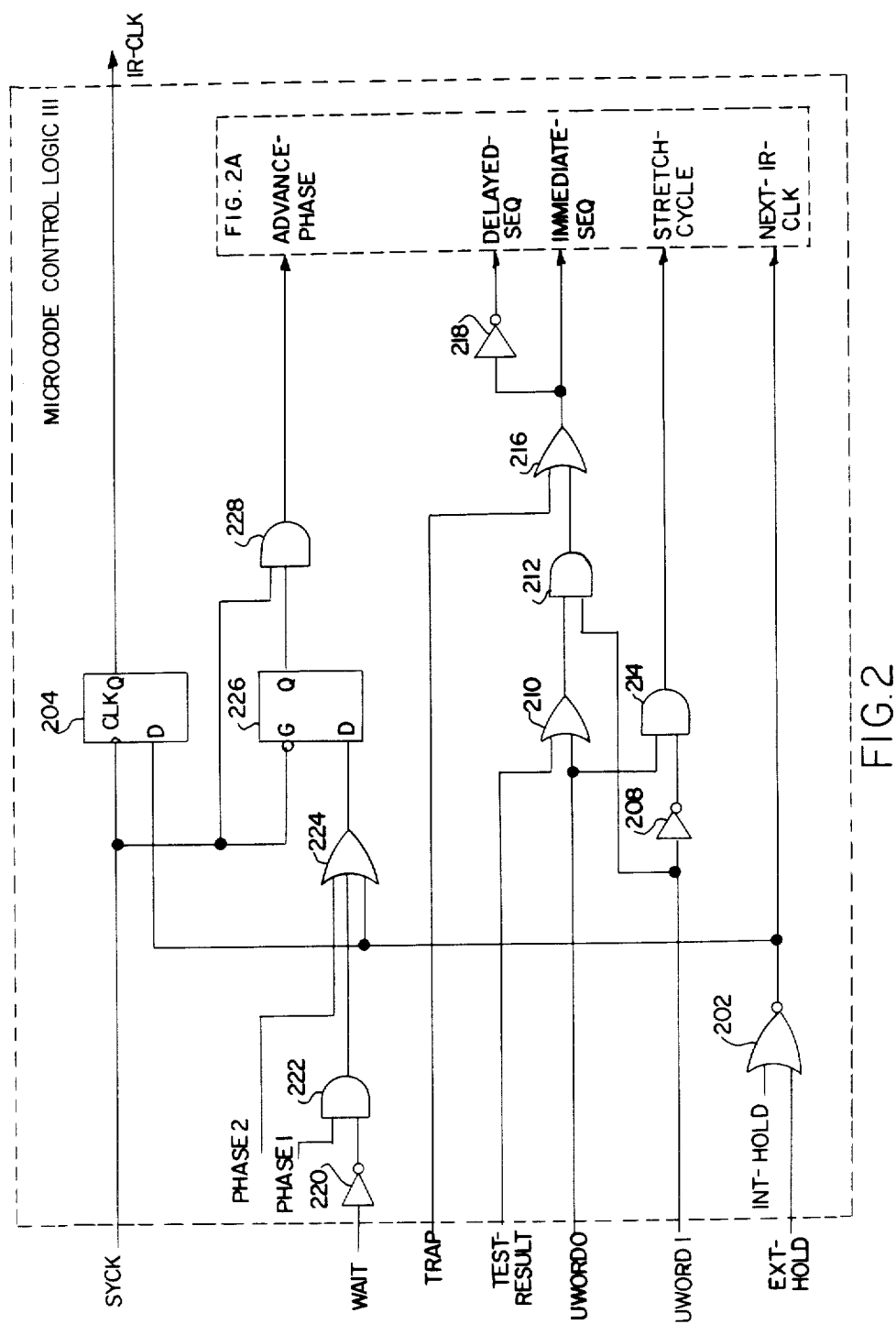

Looking now at the details of the design of the preferred embodiment of the invention, FIGS. 2 and 2A viewed together show a schematic diagram for microcode control logic 111. NOR gate 202 receives EXT_HOLD from ATU 140 and INT_HOLD from OR gate 264. The output of gate 202 (NEXT_IR_CLK) is supplied to the input of register 204 and to OR gates 224, 256 and 258. The output of register 204 is IR_CLK. The rising edge of IR_CLK defines a new microinstruction execution cycle.

As mentioned above, UWORD0 and UWORD1, 2 bits of the present microinstruction latched in register 180, in combination with TEST_RESULT in certain situations, identify to microcode control logic 111 the type of sequencing for the present microinstruction. Table 4 shows the relationship of UWORD0, UWORD1 and TEST_RESULT in this particular embodiment of the invention. An "x" entry in the TEST_RESULT column indicates that the status of the TEST_RESULT signal has no effect on the sequencing or the length of the microcycle.

TABLE 4

| UWORD0 | UWORD1 | TEST RESULT | MICRO-CYCLE | SEQUENCING |
|---|---|---|---|---|
| 0 | 0 | x | 2 SYCK | delayed |
| 0 | 1 | 0 | 2 SYCK | delayed |
| 0 | 1 | 1 | 3 SYCK | immediate |
| 1 | 0 | x | 3 SYCK | delayed |
| 1 | 1 | x | 3 SYCK | immediate |

UWORD0 and the inverse of UWORD1 are provided to AND gate 214 to yield intermediate signal STRETCH_CYCLE, indicating a delayed sequencing microinstruction which requires a stretched execution cycle containing 3 SYCK cycles. UWORD0 is also provided to OR gate 210 along with TEST_RESULT. The output of gate 210 and UWORD1 are provided to AND gate 212. The output of gate 212 is provided to OR gate 216 along with TRAP. The output of gate 216 is intermediate signal IMMEDIATE_SEQ, indicating selection of immediate sequencing. Inverter 218 inverts the output of gate 216 to yield DELAYED_SEQ, indicating selection of delayed sequencing. It can be seen that TEST_RESULT, provided as an input to gate 210, will affect the output of gate 216 only if UWORD0 is low and UWORD1 is high. It can also be seen that TRAP going high, indicating a system error condition, will force the output of gate 216 high and, therefore, force immediate sequencing.

For sequencing purposes, each execution cycle is made up of two or more phases. A normal delayed sequencing cycle contains a PHASE1 period and a PHASE3 period. An immediate sequencing cycle contains a PHASE1, a PHASE2 and a PHASE3 period. A stretched delayed sequencing cycle contains a PHASE1 and two PHASE3 periods. A variety of system exception conditions, communicated to microcode control logic 111 as either WAIT or EXT_HOLD, can operate to extend the execution cycle. Registers 240 and 242 and gates 244, 246 and 248 operate as a state machine for generating the three execution cycle timing signals PHASE1, PHASE2, and PHASE3.

The Q output of register 240, PHASE3, is supplied as an input of NOR gate 244 and as the data input to register 242. The Q output of register 242, PHASE1, is supplied as an input to NOR gate 244 and AND gate 246. Gate 246 also receives DELAYED_SEQ from gate 218. The outputs of gates 244, PHASE2, and 246 are supplied to the inputs of OR gate 248. The output of gate 248 is returned to to the data input of register 240. A high output from OR gate 238 operates to set register 242 and reset register 240. The output of gate 238, normally low, is driven high by either INITIALIZE or TRAP going high. If the output of gate 236 was driven high by TRAP, latch 232 will operate to return the output of gate 236 low at the next rising edge of SYCK.

Registers 240 and 242 are clocked by ADVANCE_PHASE from AND gate 228. Gate 228 receives as inputs SYCK and the Q output of latch 226. The output of OR gate 224 is supplied to the D input of latch 226 to control the generation of ADVANCE_PHASE. A low output from gate 224, therefore a low input to latch 226, will prevent the occurrence of the ADVANCE_PHASE rising edge and therefore extend the execution cycle for one or more SYCK cycles. Gate 224 receives as inputs the output of AND gate 222, PHASE2 from gate 244 and NEXT_IR_CLK from gate 202. The output of gate 224 will remain high whenever (1) the PHASE1 signal is high and WAIT is not asserted high, (2) the PHASE2 signal is high or (3) PHASE3 is high and neither EXT_HOLD nor INT_HOLD is high. WAIT is driven high specifically as an indication that ATU 140 is not ready to proceed with the new cycle. Because of the operation of gate 222, WAIT received anytime in PHASE2 or PHASE3 does not affect the output of gate 224 and therefore does not affect the completion of the microinstruction execution that is under way. The next execution cycle would, however, be held in the PHASE1 period until the WAIT signal is removed. EXT_HOLD and INT_HOLD operate to stretch the PHASE3 period. In this particular embodiment of the invention, the PHASE2 period is never stretched.

STRETCH_CYCLE, WAIT and IMMEDIATE_SEQ are provided to OR gate 250, the output of which is connected to AND gate 252 along with PHASE1. The output of gate 252 is supplied to OR gate 256 along with NEXT_IR_CLK. The output of gate 256 is supplied as the D input to register 260. IMMEDIATE_SEQ is also provided, along with PHASE1, to AND gate 254, the output of which is provided to OR gate 258 along with NEXT_IR_CLK. The output of gate 258 is provided to the D input of latch 262. ADVANCE_PHASE is provided to AND gate 266 and as the clocking input to latch 262. ADVANCE_PHASE and the Q output of latch 262 are provided to gate 266, the output of which is REGISTER_UADDR, the clocking input to address register 114. The Q output of register 260 is provided to gate 264 as one of the two sources for the INT_HOLD signal. INT_HOLD may also be driven high by the output of AND gate 234. Register 230 and gate 234 operate to provide a signal to gate 264 that goes high when TRAP goes high and returns low at the next SYCK rising edge.

Figure 3:
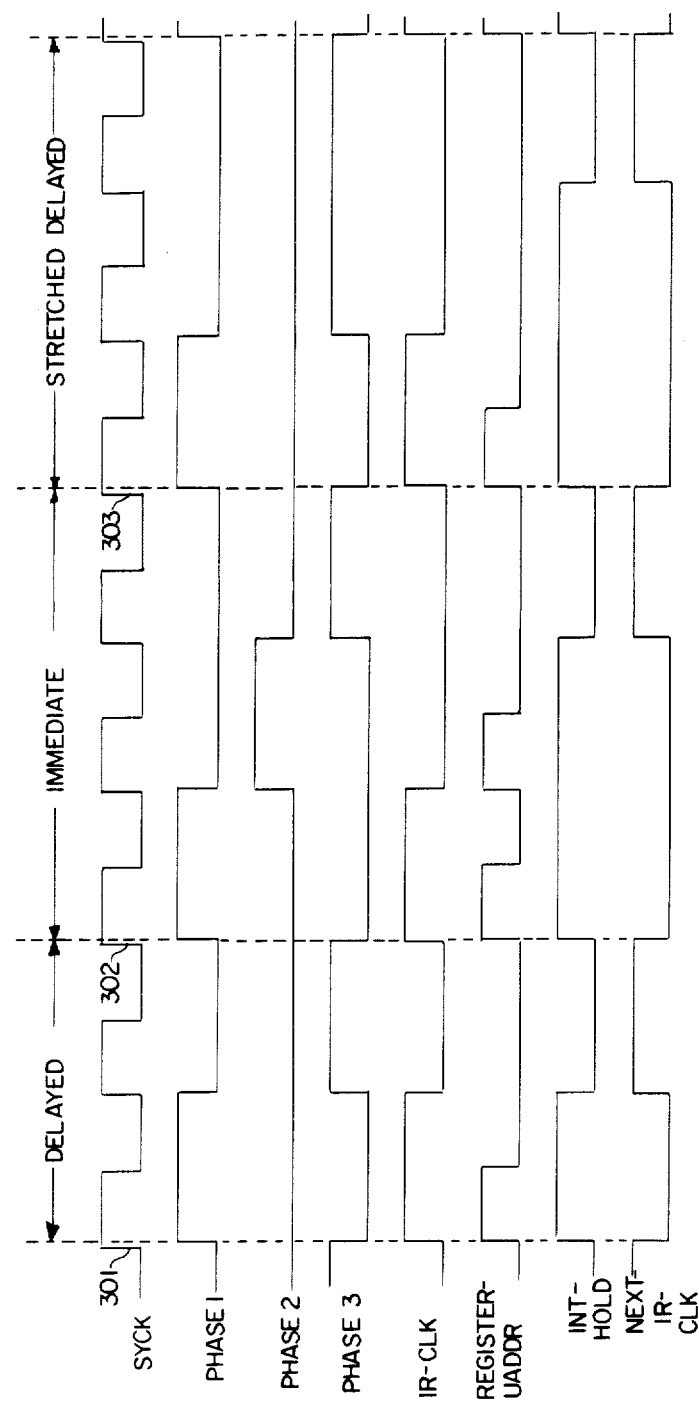
FIG. 3 is a timing diagram illustrating the operation of the microcode control logic.

As stated above, the internal phase signals PHASE1, PHASE2 and PHASE3 are generated by registers 240 and 242 and gates 244, 246 and 248. FIG. 3 shows a timing diagram for the three types of microinstruction sequencing. Just prior to the beginning of each execution cycle, PHASE3, supplied to gate 244 and to the D input of register 242, is high and the output of gate 248, supplied to the D input of register 240 is low, since PHASE1 is low. Looking first at the normal delayed sequencing case, at the next rising edge of ADVANCE_PHASE, PHASE1 will be driven high and PHASE3 will be driven low. Since this is a delayed sequencing operation, both inputs to gate 246 will be high, driving the output of gate 246 high and, therefore, the input to register 240 high. At the next rising edge of ADVANCE_PHASE, PHASE3 will be driven high and PHASE1 will be driven low. In this manner, in a series of delayed microinstructions, PHASE1 and PHASE3 periods will alternate. PHASE2 will remain low throughout the microcycle.

Looking now at the immediate sequencing case, just prior to the beginning of the execution cycle, PHASE1 and PHASE2 are low and PHASE3 is high. At the rising edge of ADVANCE_PHASE, PHASE1 is driven high and PHASE3 is driven low. Since this is not a delayed sequencing operation, DELAYED_SEQ is low and the output of gate 246 will remain low. At the following rising edge of ADVANCE_PHASE, PHASE1 is driven low, PHASE3 remains low and PHASE2 is driven high. At the following rising edge, PHASE1 remains low, PHASE2 is driven low and PHASE3 is driven high.

Looking at the stretched delayed sequencing situation, at the first rising edge of ADVANCE_PHASE in the cycle, PHASE1 is driven high. Since DELAYED_SEQ is high in this case, the outputs of gate 246 and 248 will be driven high. At the following rising edge, PHASE3 is driven high and PHASE1 is driven low. As in the normal delayed sequencing case, at the following rising edge, PHASE1 will be driven high and PHASE3 will be driven low. Since PHASE1 and PHASE2 are low and INT_HOLD is high, the output of gate 224 is low and an ADVANCE_PHASE rising edge does not occur at the next rising edge of SYCK. This operates to extend PHASE3 for an extra SYCK period.

Looking now at the overall timing for microcode control logic 111, the DELAYED segment of FIG. 3 shows signal timing for normal delayed sequencing. Just prior to the start of the microcycle, PHASE3 is high and INT_HOLD and IR_CLK are low. SYCK rising edge 301 drives PHASE3 low and PHASE1, IR_CLK and REGISTER_UADDR high. The rising edge of IR_CLK latches the new fetched microinstruction into register 180, thereby supplying it to all system elements, and the rising edge of REGISTER_UADDR latches the new address in address register 114, to initiate the fetching of the next microinstruction. At the falling edge of SYCK, ADVANCE_PHASE returns low, thereby causing gate 266 to drive REGISTER_UADDR low. At the next rising edge of SYCK, PHASE3 returns high and PHASE1 and IR_CLK return low, returning the signals to their conditions just prior to the start of the cycle.

The IMMEDIATE segment presents signal timing for the immediate sequencing case. In the IMMEDIATE case, as in the DELAYED case, rising edge 302 of SYCK drives PHASE3 low and PHASE1, REGISTER_UADDR and IR_CLK high. REGISTER_UADDR again returns low at the first falling edge of SYCK. At the next rising edge of SYCK, PHASE1 and IR_CLK are driven low and PHASE2 and REGISTER_UADDR are driven high. REGISTER_UADDR again returns low at the following falling edge of SYCK. At the third rising edge of SYCK, PHASE2 and INT_HOLD go low while PHASE3 and NEXT_IR_CLK are driven high, again returning all signals to the initial conditions. Microaddress generation logic 112 determines the new address during the first SYCK period and provides it to the inputs of address register 114. The second rising edge of REGISTER_UADDR in the microcycle then latches the new address into register 114, allowing the remaining two SYCK cycles in the microcycle for fetching the microinstruction from control store 170.

Finally, the portion of FIG. 3 identified as STRETCHED DELAYED represents signal timing for the stretched delayed sequencing case. In this case, rising edge 303 of SYCK again drives PHASE3 low and PHASE1, IR_CLK and REGISTER_UADDR high. REGISTER_UADDR again returns low at the first falling edge of SYCK. At the next rising edge of SYCK, PHASE1 and IR_CLK are driven low while PHASE3 is driven high. At the third rising edge of SYCK, PHASE3 remains high for a second SYCK period since the output of gate 224 is low as a result of INT_HOLD being high. A second REGISTER_UADDR pulse is not generated in the STRETCHED DELAYED case since addressing and fetching in one cycle is not required.

As mentioned above, the timing shown in FIG. 3 can be modified by the WAIT or EXT_HOLD going high. During PHASE1, WAIT being high will drive the output of gate 224 low and thereby prevent the rising edge of ADVANCE_PHASE from being generated by the SYCK rising edge until WAIT returns low. Since latches 240 and 242 will not be clocked in the absence of ADVANCE_PHASE, PHASE1, and therefore the microcycle, will be extended for one or more SYCK periods. Similarly EXT_HOLD being high during PHASE3 will prevent the rising edge of ADVANCE_PHASE, thereby extending PHASE3, and the microcycle, for one or more SYCK cycles until EXT_HOLD returns low.

TRAP going high will also modify the signal timing shown in FIG. 3. As far as microcode control logic 111 is affected, TRAP forces IMMEDIATE_SEQ and INT_HOLD high and resets the phase state machine by forcing the PHASE1 signal high and the PHASE3 signal low. As is well known in the art, error conditions will also cause various other actions by other system elements. Microinstruction generation logic 112 reacts to a TRAP condition by generating the first address of the set of microinstructions which will handle the error condition and by saving the addresses of the interrupted microinstruction and the microinstruction being fetched.

The invention may be embodied in yet other specific forms without departing from the spirit or essential characteristics thereof. For example, other numbers and ratios of SYCK cycles per normal and stretched microcycles may be used by the system designer. Also, the invention may be embodied such that the immediate sequencing microcycle contains a different number of SYCK cycles than the stretched delayed microcycle. In this embodiment an 80 nanosecond SYCK is used, though persons skilled in the art will appreciate that system clocks of other frequencies may be employed.

The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

We claim:

1. In a data processing system having a control store for storing microcoded microinstructions, each said microinstruction containing a plurality of instruction fields; means for generating microinstruction addresses; means for supplying a selected microinstruction address to said control store; register means for holding at least the current microinstruction; microinstruction execution means; means for supplying said current microinstruction to at least said microinstruction execution means and said microinstruction address generating means; and means for generating a timing signal; microcode control means comprising:

means, connected to said timing signal generator, for receiving said timing signal;

means, connected to said means for supplying said current microinstruction, for receiving a selected field of the current microinstruction;

means for generating a signal indicating the start of a microinstruction execution cycle;

means for supplying said microinstruction execution cycle signal to at least said microinstruction execution means;

means for generating a microinstruction address latching signal;

means for supplying said address latching signal to said means for supplying a selected microinstruction address; and signal control means, responsive to said timing signal and to the contents of said selected field, for controlling the generation of said address latching signal by said address latching signal generation means and the generation of said execution cycle signal by said execution cycle generating means, said signal control means including means, responsive to a first value of the contents of said selected field, for generating said address latching signal and said execution cycle signal at the $N^{th}$ timing signal pulse after the preceding execution cycle signal, where N is an integer such that the data processing system will perform delayed sequencing; and means, responsive to a second value of the contents of said selected field, for generating only said address latching signal at the $J^{th}$ timing signal pulse after the preceding execution cycle signal, for latching a new microinstruction address generated during the period from the beginning of the sequencing cycle and the $J^{th}$ timing pulse, where J is an integer less than or equal to N, and generating said execution cycle signal and another said address latching signal at the $K^{th}$ timing signal pulse after the preceding execution cycle signal, where K is an integer larger than N such that the data processing system will perform immediate sequencing.

2. The data processing system of claim 1 wherein said microinstruction execution means includes means for generating a trap signal having a plurality of possible conditions and wherein said microcode control means further comprises trap signal detecting means and trap signal handling means responsive to a first condition of said trap signal detecting means, said trap signal handling means including:

means, responsive to said first condition of said trap signal detecting means, for resetting said signal control means;

means, responsive to the timing signal and to the resetting of the control means, for starting said signal control means; and means, responsive to the timing signal and to said first condition of said trap signal detecting means, for causing said execution cycle signal generation means to generate an execution cycle signal.

3. The data processing system of claim 1 wherein:

said microinstruction execution means includes means for generating a test signal having a plurality of possible conditions;

said microcode control means further comprises test signal detecting means connected to said test signal generating means; and said signal control means further comprises means, responsive to a third value of said selected field and a first value of the test signal, for generating said address latching signal and said execution cycle signal at the $N^{th}$ timing signal pulse after the preceding execution cycle signal such that the data processing system will perform delayed sequencing; and means, responsive to a third value of said selected field and a second value of the test signal, for generating said address latching signal at the $J^{th}$ timing signal pulse after the preceding execution cycle signal and said execution cycle signal and said address latching signal at the $K^{th}$ timing signal pulse after the preceding execution cycle signal such that the data processing system will perform immediate sequencing.

4. The data processing system of claim 1 wherein said microinstruction, execution means includes means for generating a wait signal having a plurality of possible conditions and wherein said microcode control means further comprises wait signal detecting means connected to said wait signal generating means and wait signal handling means connected to said wait signal detecting means and to said signal control means, said wait signal handling means including:

means, responsive to a first condition of said wait signal, for suspending the operation of said microcode control means.

5. The data processing system of claim 4 wherein said microinstruction control means further includes:

means for generating a plurality of phase signals, each of said phase signals indicating a different time segment within the execution cycle, and means, connected to said phase signal generation means and said means for suspending operation, for allowing said means for suspending operation to suspend operation of said microinstruction execution means only during the first time segment in the execution cycle.

6. The data processing system of claim 1 wherein said microinstruction execution means includes means for generating a hold signal having a plurality of possible conditions and wherein said microcode control means further comprises execution cycle extending means, connected to said hold signal generating means, comprising:

means, responsive to a first condition of said hold signal, for preventing generation of a microinstruction execution cycle signal by the microinstruction execution cycle signal generation means.

7. The data processing system of claim 1 further comprising means, responsive to a third value of the contents of said selected field, for generating said address latching signal and said execution cycle signal at the $L^{th}$ timing signal pulse after the preceding execution cycle signal, where L is an integer larger than N.

8. In a data processing system having a control store for storing microinstructions, each said microinstruction having an instruction field indicating the type of sequencing for that microinstruction; means for generating microinstruction addresses; first register means for holding a selected microinstruction address; means for providing said selected microinstruction address to said register means; means for generating a latching signal to said first register means; means for supplying said selected address to said control store; second register means for holding at least the current microinstruction; means for supplying a fetched microinstruction to said second register means; means for generating a latching signal to said second register means; microinstruction execution means; means for supplying said current microinstruction to at least said microinstruction execution means; and means for generating a series of timing pulses; a method of controlling the generation and timing of said first register latching signal and said second register latching signal comprising the steps of:

(a) determining the type of sequencing indicated by the current microinstruction;

(b) if normal delayed sequencing is indicated, generating said first register and second register latching signals at the $N^{th}$ timing pulse after performing step a), where N is an integer;

(c) if stretched delayed sequencing is indicated, generating said first register and second register latching signals at the $M^{th}$ timing pulse after performing step (a), where M is an integer larger than N;

(d) if immediate sequencing is requested, performing the additional steps of
  (i) generating only said first register latching signal at the $J^{th}$ timing pulse after performing step (a) for latching a new microinstruction address generated during the period from the beginning of the sequencing cycle and the $J^{th}$ timing pulse, where J is an integer less than or equal to N, and
  (ii) generating another said first register latching signal and said second register latching signal at the $K^{th}$ timing pulse after performing step (a), where K is an integer larger than N; and (e) repeating steps (a)-(d).

9. The method of claim 8 comprising the additional steps of:

(f) monitoring for an error indication from said microinstruction execution means;

(g) if an error indication is detected, generating saidor an error indication from said microinstruction execution means;

(g) if an error indication is detected, generating said first and second register latching signal; and (i) repeating steps (f) and (g) at each occurrence of a timing pulse.

* * * * *